United States Patent
Bieber et al.

(10) Patent No.: US 11,994,208 B2
(45) Date of Patent: May 28, 2024

(54) CONTROL METHOD FOR CALIBRATING AN ACTUATION OF A CONVERTER LOCK-UP CLUTCH OF A HYDRODYNAMIC TORQUE CONVERTER

(71) Applicant: ZF Friedrichshafen AG, Friedrichshafen (DE)

(72) Inventors: Sven Bieber, Markdorf (DE); Andreas Schwarz, Langenargen (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/154,346

(22) Filed: Jan. 13, 2023

(65) Prior Publication Data

US 2023/0228326 A1 Jul. 20, 2023

(30) Foreign Application Priority Data

Jan. 18, 2022 (DE) ...................... 10 2022 200 531.7

(51) Int. Cl.
   *F16H 61/14* (2006.01)
(52) U.S. Cl.
   CPC ..... *F16H 61/143* (2013.01); *F16H 2061/145* (2013.01)
(58) Field of Classification Search
   CPC .......... F16H 61/143; F16H 1/22; F16H 3/006; F16H 3/08
   See application file for complete search history.

(56) References Cited

U.S. PATENT DOCUMENTS

| 4,464,947 A | 8/1984 | Windsor-Smith et al. |
| 5,249,475 A | 10/1993 | McAskill |

(Continued)

FOREIGN PATENT DOCUMENTS

| DE | 1129838 | 5/1962 |
| DE | 2535700 A1 | 2/1977 |

(Continued)

OTHER PUBLICATIONS

German Patent Office, Office Action issued in German patent application No. 10 2022 200 531.7 (dated Jan. 12, 2023).

*Primary Examiner* — Derek D Knight
(74) *Attorney, Agent, or Firm* — Finch & Maloney PLLC

(57) ABSTRACT

A method for calibrating an actuation of a converter lock-up clutch of a hydrodynamic torque converter having a pump wheel and a turbine wheel connected to a power-split transmission. The transmission has at least two clutches each connected to a respective power-split shaft assembly and each configured be actuated separately to close and open in order to apply a clutch torque to the turbine wheel so that a rotation speed difference between the pump wheel and the turbine wheel changes. The method includes opening the converter lock-up clutch and the at least two clutches each connected to a respective power-split shaft assembly of the transmission, rotating the pump wheel with a specified rotation speed, and applying a clutch torque to the turbine wheel as a function of an actual rotation speed difference. Clutches connected to a different respective power-split shaft assembly of the transmission are actuated in the closing direction.

14 Claims, 2 Drawing Sheets

(56) References Cited

U.S. PATENT DOCUMENTS

| | | | |
|---|---|---|---|
| 5,524,500 A | 6/1996 | Rebholz et al. | |
| 5,592,853 A | 1/1997 | Rebholz et al. | |
| 5,787,756 A | 8/1998 | Leber et al. | |
| 5,819,587 A * | 10/1998 | Leber | F16H 3/093 74/331 |
| 7,950,303 B2 | 5/2011 | Gale et al. | |
| 8,088,040 B2 * | 1/2012 | Schiele | F16H 61/0021 477/138 |
| 9,347,552 B2 | 5/2016 | Mihatsch et al. | |
| 9,927,024 B2 * | 3/2018 | Bieber | F16H 61/061 |

FOREIGN PATENT DOCUMENTS

| | | |
|---|---|---|
| DE | 101 51 537 A1 | 8/2003 |
| DE | 10 2019 200 077 A1 | 7/2020 |

* cited by examiner

CONTROL METHOD FOR CALIBRATING AN ACTUATION OF A CONVERTER LOCK-UP CLUTCH OF A HYDRODYNAMIC TORQUE CONVERTER

RELATED APPLICATIONS

This application claims the benefit of and right of priority under 35 U.S.C. § 119 to German Patent Application no. 10 2022 200 531.7, filed on 18 Jan. 2022, the contents of which are incorporated herein by reference in its entirety

TECHNICAL FIELD

The invention relates to a control method for calibrating an actuation of a converter lock-up clutch of a hydrodynamic torque converter. The invention also relates to a control unit for carrying out a control method of that type, a transmission device with such a control unit, and a vehicle with the said transmission.

PRIOR ART

DE 10 2014 222 948 A1 describes a control method for calibrating an actuation of a converter lock-up clutch of a hydrodynamic torque converter, in which, by means of a single shifting element in the transmission, the turbine wheel of the hydrodynamic torque converter connected thereto is braked.

DE 44 44 843 A1 describes a power-split, multi-gear transmission with shifting elements in the form of shifting clutches.

DESCRIPTION OF THE INVENTION

In one aspect, the invention relates to a control method for calibrating an actuation of a converter lock-up clutch of a hydrodynamic torque converter, having a pump wheel and a turbine wheel which is connected to a power-split transmission, wherein the transmission comprises at least two clutches respectively associated with a power-split shaft assembly, which clutches can be actuated separately to open and close in order to apply a clutch torque to the turbine wheel, so that a rotation speed difference between the pump wheel and the turbine wheel changes, the said method comprising the following steps:

opening of the converter lock-up clutch and the at least two clutches of the transmission respectively associated with a power-split shaft assembly, which can apply a clutch torque to the turbine wheel;

rotation of the pump wheel at a specified rotation speed; and application of a clutch torque to the turbine wheel as a function of an actual rotation speed difference in order to reach a specified set-point rotation speed difference, such that at least two clutches respectively associated with a different power-split shaft assembly of the transmission are actuated in the closing direction.

The closing can include active or passive closing. In active closing the frictional performance of the clutch concerned is increased. In passive closing the frictional performance of the clutch concerned is kept constant, in that the clutch is kept closed. Correspondingly, at least two clutches respectively each associated with a different power-split shaft assembly of the transmission can be actuated to close simultaneously. Opening refers to an active opening in which the frictional performance of the clutch concerned is reduced.

The actual rotation speed difference can be a measured rotation speed difference. In that case a measurement of an actual rotation speed difference can be carried out. This measurement can take place by determining a difference between the actual rotation speed of the pump wheel and the actual rotation speed of the turbine wheel.

The transmission can comprise two, three, four, five or even more clutches each associated with a power-split shaft assembly. Also, with a power-split shaft assembly there can be associated one, two, three or even more of the clutches. If each of the at least two clutches associated with a respective power-split shaft assembly is opened, then no clutch torque can be applied to the turbine wheel. The at least two clutches of the transmission, each associated with a power-split shaft assembly, can be clutches on the input side of the transmission. The specified rotation speed can correspond to a rotation speed of a drive unit connected to the pump wheel. The simultaneous closing can be quantitatively the same as or different from the clutch torque that results therefrom.

In a further embodiment, it can be provided that before a clutch torque is applied to the turbine wheel, the set-point rotation speed difference is divided into at least two ranges, and in two of the said at least two ranges a different number of clutches is actuated to close them in order to reach the specified set-point rotation speed difference.

In a further embodiment it can be provided that a) the set-point rotation speed difference, b) the number of ranges into which the set-point rotation speed difference is divided, or c) the number of clutches actuated in each range, is specified. Two of the parameters a), b), and c) can be predetermined. Alternatively, all three parameters a), b), and c) can be predetermined. The ranges can be the same size or of different sizes. Thus, for example, from the first of the set-point rotation speed differences at the farthest range, the ranges can, for example, become larger toward the range next to the last of the set-point rotation speed differences. The size of a range can be adapted to the maximum clutch torque of the respective clutches actuated therein. The maximum clutch torque is the maximum acceptable frictional performance for a clutch. Thus, the said adaptation can take place on the basis of the lowest maximum clutch torque of the respective clutches actuated therein. The lowest range can begin at a rotation speed difference of 0. The highest range ends at the set-point rotation speed difference.

In a further embodiment it can be provided that the number of ranges into which the set-point rotation speed difference is divided is smaller or equal to the number of clutches that can be actuated separately in order to reach the specified set-point rotation speed difference.

In a further embodiment it can be provided that two or three clutches that can be actuated are actuated over two ranges. With n ranges the number of clutches can be smaller than or equal to n.

In a further embodiment it can be provided that the actual rotation speed difference from the first to the n-th range, which is delimited by the set-point rotation speed difference, is increased by a corresponding closing actuation of an increasing number of clutches which can be actuated separately, in order to reach the specified set-point rotation speed difference.

In a further embodiment it can be provided that in at least two adjacent ranges, the same number of clutches are actuated. During this the respective clutches can be actuated differently, so that individually they produce different clutch torques in such manner that, when added together, the clutch torques of the particular clutches actuated in that range remains the same or increases from the one range to the next-higher adjacent range. With two ranges, in the first range one clutch and in the second range two, three or more clutches can be actuated in the closing direction. With two ranges, in the first range two clutches and in the second range three or more clutches are actuated to close.

In a further embodiment it can be provided that in at least one of the ranges each of the clutches that can be actuated in order to reach the specified set-point rotation speed difference, is actuated to close.

In further embodiments it can be provided that of all these ranges are at least the last two ranges or the last range. With two ranges and two clutches that can be actuated in the closing direction, in the second range the two clutches that can be actuated can be closed. With two ranges and three clutches that can be actuated in the closing direction, in the second range all three controllable clutches can be closed.

Ina further embodiment it can be provided that at least in the range which is closest to the set-point rotation speed difference, each clutch that can be actuated in order to reach the specified set-point rotation speed difference is actuated in the closing direction.

This range is also called the last, or the n-th range. With a total of two ranges this range then corresponds to the second range. With a total of three ranges, this range then corresponds to the third range.

In a further embodiment it can be provided that at least in the range farthest away from the set-point rotation speed difference, one of the clutches that can be actuated in order to reach the specified set-point rotation speed difference is actuated to close.

This range can also be called the first range. That can be a single clutch. The said clutch can have the lowest or the highest maximum clutch torque, i.e. the lowest or the highest frictional performance of all the clutches that can be actuated to close.

In a further embodiment it can be provided that the step of applying a torque to the turbine wheel comprises at least the following part-steps: closing of the first clutch in order to apply an increasing clutch torque to the turbine wheel, until the actual rotation speed difference has reached a specified rotation speed difference; closing at least one further clutch in addition to the first clutch in order, by each of the at least one further clutch, to apply a still greater clutch torque to the turbine wheel until the actual rotation speed difference has reached the set-point rotation speed difference; adjusting the actual rotation speed difference to the set-point rotation speed difference, in that at least one of the clutches is actuated to close or open until the set-point difference is maintained over a determined time interval and within a determined tolerance range.

In a further embodiment it can be provided that after the step of applying a torque to the turbine wheel, the step of calibrating filling parameters of the converter lock-up clutch is carried out. During this the converter lock-up clutch can be closed until a "touch point" is approached, at which the set-point rotation speed difference is no longer maintained. This step can be repeated during the course of an iterative search for the optimum filling parameters, until the reduction of the set-point rotation speed difference corresponds to specified indicators.

According to a further aspect the invention relates to a control unit for carrying out the control method, such that the control unit comprises the following features:
a signal input for receiving an input signal from a determination device for determining an actual rotation speed difference between the pump wheel and the turbine wheel;
a signal output for emitting an initial signal, the actuation command for closing two clutches; and
a computer unit, which is connected to the signal input and the signal output and is designed, on the basis of an input signal, to generate an output signal as a function of the calculated actual rotation speed difference.

In a further embodiment it can be provided that the control unit is integrated into an existing control unit, or that it is a separate control unit. The signal transmission and connections to the signal input and the signal output can be wired or wireless. The output signal can depend on the actual rotation speed difference and the range within which this actual rotation speed difference is located. The output signal can depend on the actual rotation speed difference, the range within which this actual rotation speed difference is located, and the number of clutches to be actuated in that range. The determination device can be a separate device, or it can be at least partially integrated in the control unit.

Furthermore, the invention relates to a transmission device incorporating the said control unit, wherein the transmission device comprises the following features:
a hydrodynamic torque converter with a converter lock-up clutch, wherein the hydrodynamic torque converter comprises a pump wheel and a turbine wheel; and
a power-split transmission connected to the turbine wheel, wherein the transmission comprises at least two clutches associated in each case with a power-split shaft assembly, which clutches are separately connected to the signal input and the signal output in such manner that they can be actuated to close and open in order to apply a clutch torque to the turbine wheel, so that an actual rotation speed difference between the pump wheel and the turbine wheel changes.

In a further embodiment it can be provided that the hydrodynamic torque converter is connected by way of the turbine wheel on its output side to the transmission device. The hydrodynamic torque converter can comprise a guide wheel.

In addition, the invention relates to a vehicle with the transmission device for transmitting a driving force from a drive device in order to propel the vehicle.

In a further embodiment it can be provided that the hydrodynamic torque converter is connected on its input side directly or indirectly to the drive device in order to propel the vehicle.

Embodiments or features described in the context of one aspect of the invention can be combined with embodiments or features described in the context of another aspect of the invention.

DETAILED DESCRIPTION OF EMBODIMENTS

Figure 1:
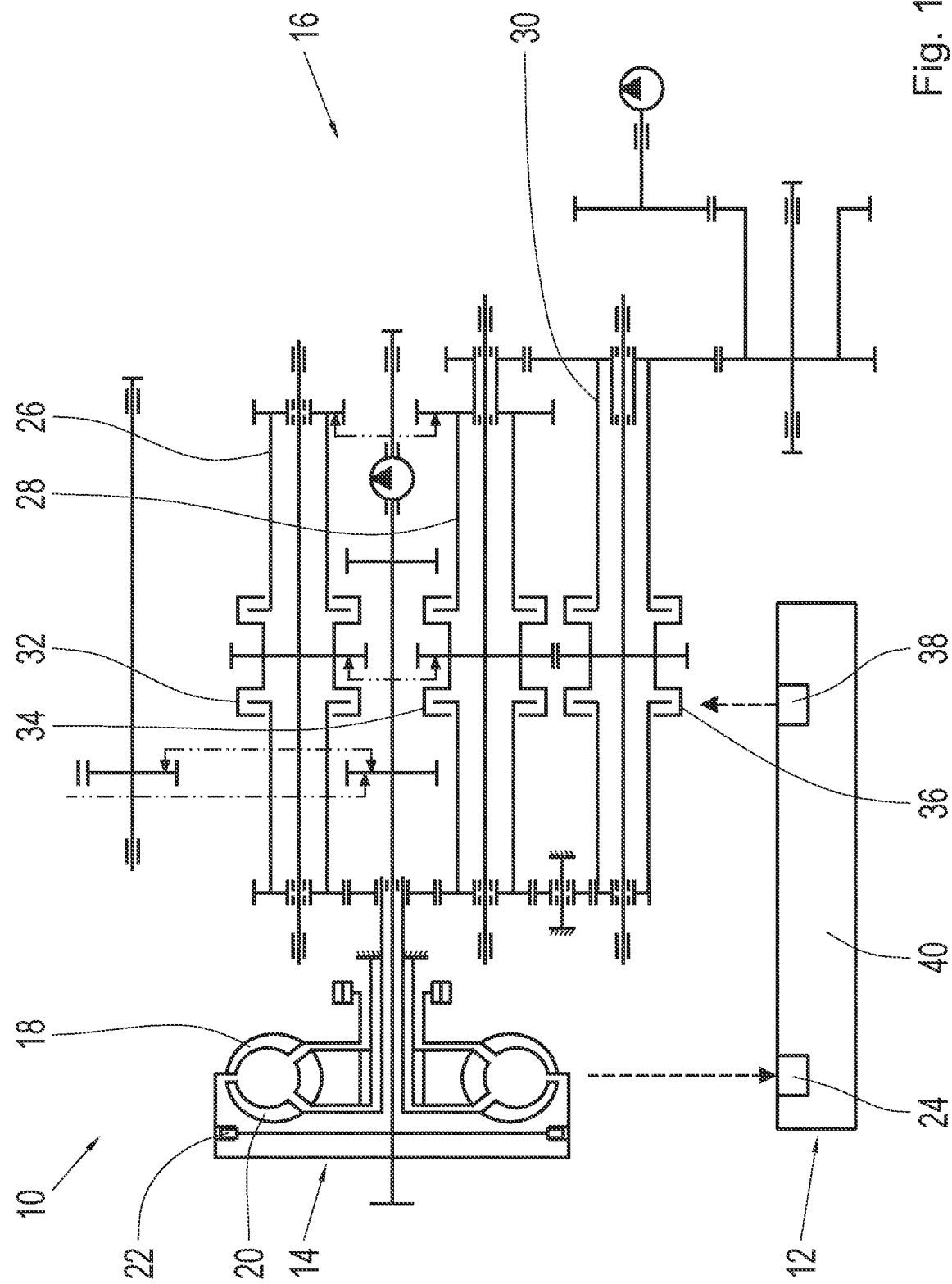
FIG. 1: shows a transmission device comprising a hydrodynamic torque converter with a converter lock-up clutch and a power-split transmission connected thereto.
Figure 2:
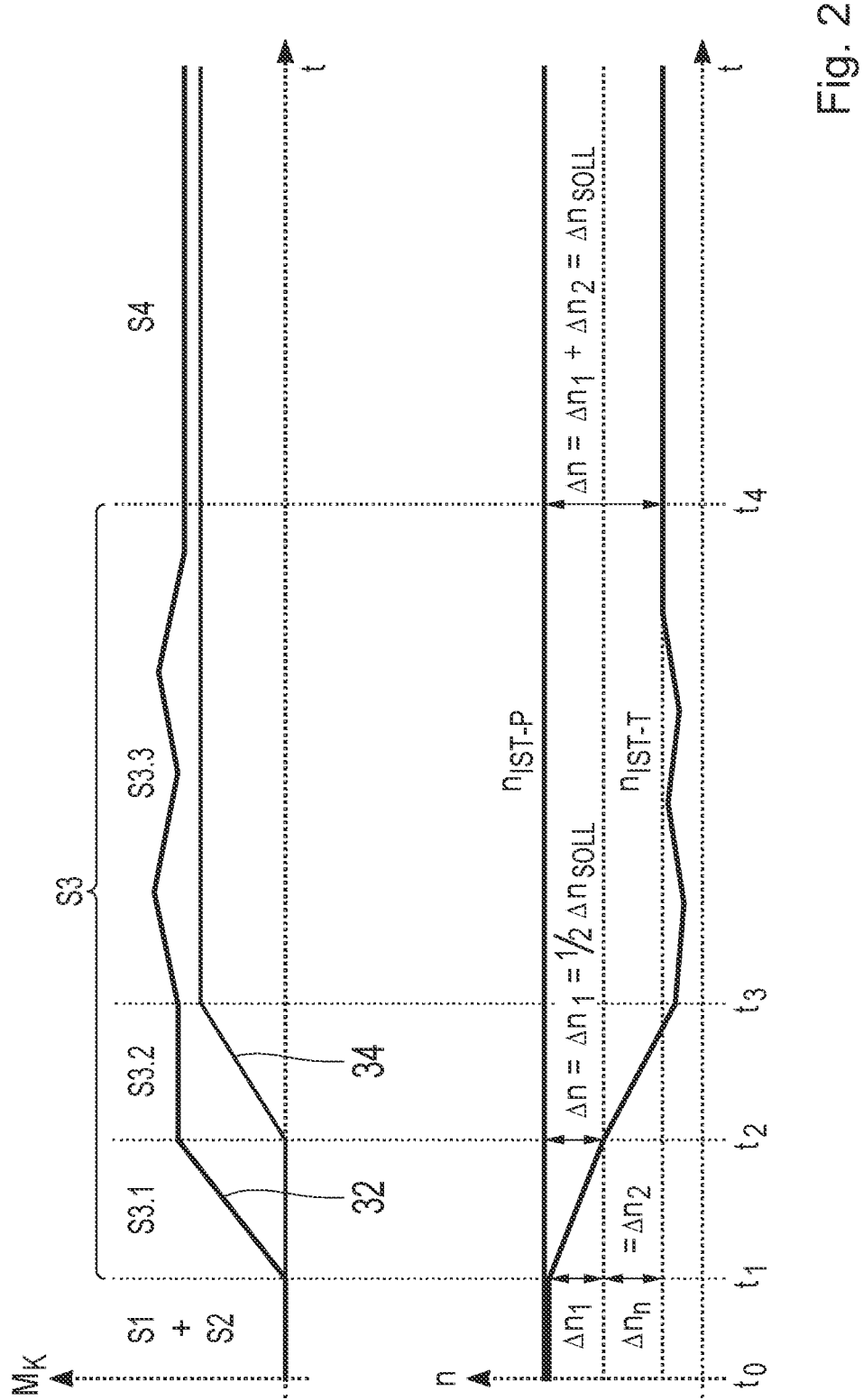
FIG. 2: shows two control diagrams, one above the other, for a control method for the calibration of an actuation of the converter lock-up clutch of the hydrodynamic torque converter in FIG. 1.

FIGS. 1 and 2 show an embodiment.

FIG. 1 shows a transmission device 10 with a control unit 12. The transmission device 10 is part of a vehicle (not shown) and is designed to transmit a driving force from a drive unit in order to propel the vehicle. The transmission device 10 comprises a hydrodynamic torque converter 14 and a power-split transmission 16.

The hydrodynamic torque converter 14 comprises a pump wheel 18 and a turbine wheel 20, and a converter lock-up clutch 22, which in this case can be actuated by a hydraulic disk clutch, and which has an internal pressure of up to 6 bar. The rotation speed difference $\Delta n$ between the pump wheel 18 and the turbine wheel 20 can be determined by means of a determination device (not shown) connected to the control unit 12 for the direct or indirect determination of an actual rotation speed difference $\Delta n_{IST}$. The hydrodynamic torque converter 14 is connected on its input side by way of the pump wheel 18 to the drive unit for propelling the vehicle and by way of the turbine wheel on its output side to the transmission 10. Thus, the rotation speed n of the pump wheel 18 corresponds to the output-side rotation speed n of the drive unit. Consequently, the rotation speed n of the pump wheel 18 can be taken to be the rotation speed n of the drive unit. The general mode of operation of such a hydrodynamic torque converter 14 with a converter lock-up clutch 22 is already known from the prior art.

The power-split transmission 16 is connected on its input side to the turbine wheel 20 and comprises three clutches 32, 34, 36, each associated with a respective power-split shaft assembly 26, 28, 30. The clutches 32, 34, 36 associated with a power-split shaft assembly 26, 28, 30 are clutches of the transmission 16 on the input side. The clutches 32, 34, 36 are connected to a signal output 38 of the control unit 12 and can be actuated separately to close and open them, in order to apply a clutch torque $M_K$ to the turbine wheel 20 so that the rotation speed difference $\Delta n$, i.e. the slippage between the pump wheel 18 and the turbine wheel 20 changes. In this case the clutch 32 is a clutch for forward driving (KV), the clutch 34 is a clutch for reverse driving (KR) and the clutch 36 is a further clutch (K4). If each of the clutches 32, 34, 36 associated with a power-split shaft assembly 26, 28, 30 is opened, then no clutch torque $M_K$ is applied to the turbine wheel 20.

The control unit 12 is designed to carry out a control method. For that purpose the control unit 12 comprises the signal input 24 for receiving an input signal, which transmits the actual rotation speed $n_{IST-P}$ of the pump wheel 18 and the actual rotation speed $n_{IST-T}$ of the turbine wheel 20 of the hydrodynamic torque converter 14. In addition, the control unit 12 comprises the signal output 38 for emitting an output signal, which transmits the actuation commands for the simultaneous closing of at least two of the clutches 32, 34, 36. Furthermore, the control unit 12 comprises a computer unit 40 which is connected to the signal input 24 and the signal output 38 and is designed, by virtue of an input signal, to calculate an actual rotation speed difference $\Delta n_{IST}$ between the pump wheel 18 and the turbine wheel 20 and to generate an output signal as a function of the calculated actual rotation speed difference $\Delta n_{IST}$.

FIG. 2 shows two control diagrams, one above the other, for a control method for calibrating an actuation of the converter lock-up clutch 22 of the hydrodynamic torque converter 14 in FIG. 1. In both control diagrams the time t is plotted on the x-axis, wherein time points such as those marked as $t_0$, $t_1$, $t_2$, $t_3$, and $t_4$ on one of the x-axes correspond to the equivalent time points on the other x-axis. On the y-axis the upper control diagram shows the respective clutch torques $M_K$ while the lower diagram shows the respective rotation speeds n.

The control method shown here is provided for large structural forms with correspondingly large manufacturing tolerances, and is carried out in the case of a stationary vehicle or a transmission correspondingly static on its output side during production, after an oil change or during the identification of inadequate shifting behavior, and comprises the following steps:

Step 1 (S1):

Opening of the converter lock-up clutch 22 and of the two clutches 32, 34 of the transmission 16, each respectively associated with a power-split shaft assembly 26, 28, which clutches are able to apply a clutch torque $M_K$ to the turbine wheel 20;

Step 2 (S2):

Rotating S2 the pump wheel 18 with a specified rotation speed n; and

Step 3 (S3):

Application S3 of a clutch torque $M_K$ to the turbine wheel 20 as a function of the actual rotation speed difference $\Delta n_{IST}$ in order to reach a specified set-point rotation speed difference $\Delta n_{SOLL}$, wherein two clutches 32, 34, each respectively associated with a different power-split shaft assembly 26, 28 of the transmission 16, are actuated at the same time to close them.

The set-point rotation speed difference $\Delta n_{SOLL}$ is in this case specified in just the same way as the two equally large ranges $\Delta n_{=1}$, $\Delta n_2$ into which the set-point rotation speed difference $\Delta n_{SOLL}$ is divided. Thus, both the first range $\Delta n_1$ and the second range $\Delta n_2$ each correspond to half the set-point rotation speed difference $h/\Delta n_{SOLL}$.

The first range $\Delta n_1$ extends from time-point $t_1$ to time-point $t_2$, during which the first clutch 32 is closed in order to apply an increasing clutch torque $M_K$ to the turbine wheel 20. Time-point $t_2$ is reached when the actual rotation speed difference $\Delta n_{IST}$ has reached the top end of the first range $\Delta n_1$ and thus at the same time the lower end of the second range $\Delta n_2$ at the half rotation speed difference $\frac{1}{2}\Delta n_{SOLL}$. From that time-point $t_2$ onward the clutch torque $M_K$ applied by the first clutch 32, i.e. the frictional performance of the clutch 32, is kept constant in that the first clutch 32 is not closed or opened any farther. Instead, now in addition the second clutch 34 is closed in order to increase the clutch torque $M_K$ on the turbine wheel 20 still more. In this case the time-point $t_3$ is reached when the actual rotation speed difference $\Delta n_{IST}$ has reached the top end of the second range $\Delta n_2$ at the set-point rotation speed difference $\Delta n_{SOLL}$. From time-point $t_3$ onward, the actual rotation speed difference $\Delta n_{IST}$ is adjusted to the set-point rotation speed difference $\Delta n_{SOLL}$ in that only and exclusively the first clutch 32 is actuated to close or open it. As soon as the set-point rotation speed difference $\Delta n_{SOLL}$ has been maintained over a defined time period and within a defined tolerance range, the time-point to has been reached. From this time-point $t_4$ onward, in this condition a calibration process known from the prior art, for example calibration of the filling parameters of the converter lock-up clutch 22, is carried out in a subsequent Step 4 (S4). During this the converter lock-up clutch 22 is closed until a "touch point" is approached, at which the setpoint rotation speed difference $\Delta n_{SOLL}$ is no longer maintained. When during the course of a corresponding iterative search for the optimum filling parameters the fall of the set-point rotation speed difference $\Delta n_{SOLL}$ conforms to specified indicators, the filling is taken to be ideal.

By virtue of the division of the set-point rotation speed difference $\Delta n_{SOLL}$ into a number of ranges $\Delta n_1$, $\Delta n_2$, the Step 3 (S3) can be divided into the following part-steps:

Step 3.1 (S3.1):

Closing of the first clutch 32 in order to apply an increasing clutch torque $M_K$ to the turbine wheel 20, until the actual rotation speed difference $\Delta n_{IST}$ has reached half the set-point rotation speed difference $\frac{1}{2}\Delta n_{SOLL}$;

Step 3.2 (S3.2):

Closing the second clutch 34 in addition to the first clutch 32, in order to apply a still larger clutch torque $M_K$ to the turbine wheel 20, until the actual rotation speed difference $\Delta n_{IST}$ has reached the set-point rotation speed difference $\Delta n_{SOLL}$;

Step 3.3 (S3.3):

Adjustment of the actual rotation speed difference $\Delta n_{IST}$ to the set-point rotation speed difference $\Delta n_{SOLL}$, in that exclusively the first clutch 32 is actuated to close it or open it, until the set-point rotation speed difference $\Delta n_{SOLL}$ is maintained over a defined time period and within a defined tolerance range.

The condition reached in this way serves as the starting point for further steps, and thus in this case for the subsequent Step 4 (S4):

Step 4 (S4):

Calibration of filling parameters of the converter lock-up clutch 22.

Below further embodiments are described, which conform to the above-described basic principles.

According to a further embodiment it is provided that the closing process consists of an active or passive closing. In active closing the frictional performance of the clutch concerned is increased. In passive closing the frictional performance of the clutch concerned is kept constant, in that the clutch is kept closed. Correspondingly, according to a further embodiment it is provided that at least two clutches respectively associated with a different shaft assembly of the transmission are actuated in the closing direction at the same time. Opening refers to an active opening process in which the frictional performance of the clutch concerned is reduced.

According to a further embodiment it is provided that the transmission 16 comprises only two clutches 32, 34 associated with a power-split shaft assembly 26, 28 on the input side. In a further embodiment the transmission 16 comprises three—as described in the first embodiment—or more than three such clutches 32, 34·36. In another embodiment the simultaneous closing of the at least two clutches 32, 34, 36, i.e. the clutch torque that results therefrom, is quantitatively the same or different.

According to a further embodiment it is provided that before a clutch torque $M_K$ is applied to the turbine wheel 20, the set-point rotation speed difference $\Delta n_{SOLL}$ is divided into at least two ranges $\Delta n_1$-$\Delta n_n$ as described in the first embodiment. According to a further embodiment, in two $\Delta n_1$, $\Delta n_2$ of the at least two ranges $\Delta n_1$-$\Delta n_n$ a different number of clutches 32, 34 is actuated in the closing direction in order to reach the specified set-point rotation speed difference $\Delta n_{SOLL}$. In another embodiment a) the set-point rotation speed difference $\Delta n_{SOLL}$, b) the number of ranges into which the set-point rotation speed difference $\Delta n_{SOLL}$ is divided, or c) the number of clutches actuated in each range $\Delta n_n$ is specified. According to a further embodiment two of the variables a), b), and c) are predetermined. In another embodiment all three variables a), b), and c) are predetermined.

According to a further embodiment the ranges $\Delta n_1$-$\Delta n_n$ are all the same size—as described in the first embodiment—or of different sizes. In a further embodiment the ranges $\Delta n_1$-$\Delta n_n$ become larger toward the set-point rotation speed difference $\Delta n_{SOLL}$. In another embodiment the size of a range $\Delta n_n$ is adapted to the maximum clutch torque of the clutches respectively actuated in it. According to a further embodiment this adaptation takes place on the basis of the lowest maximum clutch torque $M_K$ of the clutches respectively actuated therein. The maximum clutch torque $M_K$ refers to the maximum permissible frictional performance for a clutch. In a further embodiment the lowest range begins at a rotation speed difference $\Delta n$ of 0. The highest range ends—as described in the first embodiment—at the set-point rotation speed difference $\Delta n_{SOLL}$.

According to a further embodiment the number of ranges into which the set-point rotation speed difference $\Delta n_{SOLL}$ is divided, is smaller than or equal to a number of clutches that can be actuated separately in order to reach the specified set-point rotation speed difference $\Delta n_{SOLL}$. Thus, in the first embodiment two controllable clutches 32, 34 can be actuated over a range $\Delta n_2$. According to a further embodiment three controllable clutches can be actuated over two ranges. In another embodiment, with n ranges the number of clutches is smaller than or equal to n.

According to a further embodiment the actual rotation speed difference $\Delta n_{IST}$ is increased from the first range $\Delta n_1$ to the last or n-th range $\Delta n_n$, which is limited by the set-point rotation speed difference $\Delta n_{SOLL}$, by correspondingly actuating an increasing number of separately controllable clutches in the closing direction in order to reach the specified set-point rotation speed difference $\Delta n_{SOLL}$. In a further embodiment, in at least two adjacent ranges the same number of clutches are actuated. According to another embodiment the respective clutches are actuated differently so that they individually produce a different clutch torque $M_K$, in such manner that the sum of the clutch torques $M_K$ of the clutches actuated in the said range remains the same or increases from one range to the next-higher adjacent range. According to further embodiments, when there are two ranges $\Delta n_1$, $\Delta n_2$, in the first range $\Delta n_1$ one clutch 32 is actuated and in the second range $\Delta n_2$ two clutches 32, 34—as described in the first embodiment—or alternatively three or more clutches are actuated to close. In another embodiment, when there are two ranges two controllable clutches can be actuated to close, and in the second range three or more clutches can be actuated to close.

According to a further embodiment, in at least one of the ranges each of the clutches that can be actuated in order to reach the specified set-point rotation speed difference $\Delta n_{SOLL}$ is actuated to close. In further embodiments all these ranges are at least the last two ranges or the last range. According to a further embodiment, with two ranges and two clutches that can be actuated to close in the second range, both of the controllable clutches are closed. In a further embodiment, with two ranges and three clutches that can be actuated to close, in the second range all three of the controllable clutches can be closed.

According to a further embodiment, at least in the range closest to the set-point rotation speed difference $\Delta n_{SOLL}$, each of the clutches that can be actuated in order to reach the specified set-point rotation speed difference $\Delta n_{SOLL}$ is actuated to close. This range is also called the last or the n-th range. With a total of two ranges $\Delta n_1$, $\Delta n_2$, this range $\Delta n_n$ then corresponds to the second range $\Delta n_2$. With a total of three ranges the said range then corresponds to the third range, etc.

In a further embodiment, at least in the range which is farthest away from the set-point rotation speed difference $\Delta n_{SOLL}$, one clutch 32 of those clutches which can be actuated in order to reach the specified set-point rotation speed difference $\Delta n_{SOLL}$ is actuated to close. This range is also called the first range $\Delta n_1$. According to a further embodiment, the said clutch 32 has the lowest or the highest maximum clutch torque $M_K$, i.e. the lowest or the highest maximum frictional performance of all the clutches that can be actuated to close.

According to a further embodiment the hydrodynamic torque converter comprises a guide wheel.

In a further embodiment, the hydrodynamic torque converter is connected by way of the pump wheel on its input side, directly or indirectly, for example via a further gear system, to the drive device for propelling the vehicle.

According to a further embodiment, the adjustment (S3.3) of the actual rotation speed difference $\Delta n_{IST}$ to the set-point rotation speed difference $\Delta n_{SOLL}$ takes place in that at least one of the clutches, for example at least the first/earliest actuated clutch or at least the last/most-recently actuated clutch, is actuated to close or to open, until the set-point rotation speed difference $\Delta n_{SOLL}$ is maintained over a defined time period and within a defined tolerance range.

Thus, the invention provides for a division of the clutch torque $M_K$ required in order to reach a set-point rotation speed difference $\Delta n_{SOLL}$ between at least two clutches. In that way, instead of actuating a single clutch up to its maximum frictional performance, the frictional performance can be divided between two or more clutches, which increases the life of the individual clutches and enables a lastingly reliable calibration of the converter lock-up clutch 22.

INDEXES

10 Transmission device
12 Control unit
14 Hydrodynamic torque converter
16 Transmission
18 Pump wheel
20 Turbine wheel
22 Converter lock-up clutch
24 Signal input
26 Shaft assembly
28 Shaft assembly
30 Shaft assembly
32 Clutch (KV in the shaft assembly 26)
34 Clutch (KR in the shaft assembly 28)
36 Clutch (K4 in the shaft assembly 30)
38 Signal output
40 Computer unit
$M_K$ Clutch torque
$n_{IST-P}$ Actual rotation speed (of the pump wheel 18)
$n_{IST-T}$ Actual rotation speed (of the turbine wheel 20)
n Rotation speed
$\Delta n$ Rotation speed difference
$\Delta n_{IST}$ Actual rotation speed difference
$\Delta n_{SOLL}$ Set-point rotation speed difference
$\Delta n_1$ First range (of the set-point rotation speed difference $\Delta n_{SOLL}$)
$\Delta n_2$ Second range (of the set-point rotation speed difference $\Delta n_{SOLL}$)
$\Delta n_n$ Last/n-th range (of the set-point rotation speed difference $\Delta n_{SOLL}$)
$t_0$ Time-point (start)
$t_1$ Time-point ($0 \leq \Delta n < \frac{1}{2}\Delta n_{SOLL}$)
$t_2$ Time-point ($\Delta n = \frac{1}{2}\Delta n_{SOLL}$)
$t_3$ Time-point ($\Delta n \approx \Delta n_{SOLL}$)
14 Time-point ($\Delta n = \Delta n_{SOLL}$)

The invention claimed is:

1. A control method for calibrating an actuation of a converter lock-up clutch of a hydrodynamic torque converter with a pump wheel and a turbine wheel, which is connected to a power-split transmission, wherein the transmission comprises at least two clutches each associated with a respective power-split shaft assembly and configured to be actuated separately to close and open in order to apply a clutch torque ($M_K$) to the turbine wheel and thereby change a rotation speed difference between the pump wheel and the turbine wheel, the control method comprising:
    opening the converter lock-up clutch and the at least two clutches each associated with a respective power-split shaft assembly of the transmission, wherein the at least two clutches are configured to apply the clutch torque to the turbine wheel;
    rotating the pump wheel at a specified rotation speed; and
    applying the clutch torque ($M_K$) to the turbine wheel as a function of the rotation speed difference between the pump wheel and the turbine wheel, in order to reach a specified set-point rotation speed difference; and
    actuating the at least two clutches to close, each of the at least two clutches associated with the respective power-split shaft assembly of the transmission;
    dividing, before applying the clutch torque to the turbine wheel, the specified set-point rotation speed difference into at least two ranges, wherein a number of ranges in the at least two ranges is smaller than or equal to a number of clutches of the at least two clutches that can be actuated separately in order to reach the specified set-point rotation speed difference;
    actuating, in two of the at least two ranges, a different number of the at least two clutches in a closing direction in order to reach the specified set-point rotation speed difference;
    increasing the rotation speed difference from a first to an nth range of the at least two ranges; and
    limiting the rotation speed difference by the set-point rotation speed difference by correspondingly actuating in the closing direction an increasing number of the at least two clutches which can be actuated separately in order to reach the specified set-point rotation speed difference.

2. The control method according to claim 1, further comprising, at least in one of the at least two ranges, actuating, in a closing direction, each of the at least two clutches that can be actuated separately in order to reach the specified set-point rotation speed difference.

3. The control method according to claim 1, further comprising at least in a range closest to the set-point rotation speed difference, actuating in the closing direction each of the at least two clutches that can be actuated in order to reach the specified set-point rotation speed difference.

4. The control method according to claim 1, further comprising at least in a range farthest away from the set-point rotation speed difference, actuating in the closing direction one of the at least two clutches that can be actuated in order to reach the specified set-point rotation speed difference.

5. A control unit for carrying out a control method for calibrating an actuation of a converter lock-up clutch of a hydrodynamic torque converter having a pump wheel and a turbine wheel that is connected to a power-split transmission, wherein the transmission comprises at least two clutches each associated with a respective power-split shaft assembly and each configured to be actuated separately to close and open in order to apply a clutch torque to the turbine wheel and thereby change a rotation speed difference between the pump wheel and the turbine wheel,
wherein the control unit comprises:
a signal input configured for receiving an input signal from a detection device for determining the rotation speed difference between the pump wheel and the turbine wheel;
a signal output configured for emitting an output signal that contains actuation commands for closing the at least two clutches; and
a computer unit connected to the signal input and to the signal output, the computer unit configured, on a basis of the input signal, to generate the output signal as a function of the rotation speed difference;
wherein the control method comprises:
opening the converter lock-up clutch and the at least two clutches;
rotating the pump wheel at a specified rotation speed; and
applying the clutch torque to the turbine wheel as a function of the rotation sped difference between the pump wheel and the turbine wheel in order to reach a specified set-point rotation speed difference; and
actuating the at least two clutches to close, each of the at least two clutches associated with the respective power-split shaft assembly of the transmission.

6. A transmission device with the control unit according to claim 5, wherein the transmission device comprises:
the hydrodynamic torque converter with the converter lock-up clutch, wherein the hydrodynamic torque converter comprises the pump wheel and the turbine wheel; and
the power-split transmission connected to the turbine wheel, wherein the power-split transmission contains the at least two clutches.

7. A vehicle with the transmission device according to claim 6, wherein the transmission device is configured for transmitting a drive force from a drive device for the propulsion of the vehicle.

8. A control method for calibrating an actuation of a converter lock-up clutch of a hydrodynamic torque converter having a pump wheel and a turbine wheel connected to a power-split transmission, the transmission having at least two clutches each assigned to a power-split shaft train which can be controlled separately for closing and opening in order to apply a clutch torque to the turbine wheel, in order to change a differential speed between the pump wheel and the turbine wheel, the control method comprising:

opening the converter lock-up clutch and the at least two clutches of the transmission;
rotating the pump wheel at a predetermined speed;
applying the clutch torque to the turbine wheel as a function of the differential speed in order to achieve a predetermined target differential speed; and
actuating to close the at least two clutches.

9. The control method according to claim 8, further comprising:
closing the at least two clutches;
dividing, before applying the clutch torque to the turbine wheel, the specified set-point rotation speed difference into at least two ranges, wherein a number of ranges in the at least two ranges is smaller than or equal to a number of clutches of the at least two clutches that can be actuated separately in order to reach the specified set-point rotation speed difference; and
closing, in two of the at least two ranges, a different number of the at least two clutches in order to reach the specified set-point rotation speed difference.

10. The control method according to claim 9, wherein a number of ranges in the at least two ranges is smaller than or equal to a number of clutches of the at least two clutches that can be actuated separately in order to reach the specified set-point rotation speed difference.

11. The control method according to claim 10, further comprising:
increasing the rotation speed difference from a first to an nth range of the at least two ranges; and
limiting the rotation speed difference to the set-point rotation speed difference by correspondingly closing an increasing number of the at least two clutches which can be actuated separately in order to reach the specified set-point rotation speed difference.

12. The control method according to claim 9, further comprising, at least in one of the at least two ranges, closing each of the at least two clutches that can be actuated separately in order to reach the specified set-point rotation speed difference.

13. The control method according to claim 9, further comprising at least in a range closest to the set-point rotation speed difference, actuating in the closing direction each of the at least two clutches that can be actuated in order to reach the specified set-point rotation speed difference.

14. The control method according to claim 9, further comprising at least in a range farthest away from the set-point rotation speed difference, actuating in the closing direction one of the at least two clutches that can be actuated in order to reach the specified set-point rotation speed difference.

* * * * *